United States Patent [19]

Maassen et al.

[11] Patent Number: 4,844,162

[45] Date of Patent: Jul. 4, 1989

[54] APPARATUS AND METHOD FOR TREATING GEOTHERMAL STEAM WHICH CONTAINS HYDROGEN SULFIDE

[75] Inventors: Brian W. Maassen, Santa Rosa; Richard G. Campbell, Monrovia, both of Calif.

[73] Assignee: Union Oil Company of California, Los Angeles, Calif.

[21] Appl. No.: 139,582

[22] Filed: Dec. 30, 1987

[51] Int. Cl.$^4$ .................. E21B 43/24; E21B 43/40
[52] U.S. Cl. ..................... 166/267; 166/303; 423/DIG. 19; 60/641.2; 55/73
[58] Field of Search ............... 166/267, 303; 423/DIG. 19; 60/641.2, 641.3, 641.4, 641.5; 165/913, 921; 210/747, 170; 55/73, 269

[56] References Cited

U.S. PATENT DOCUMENTS

| | | | |
|---|---|---|---|
| 3,817,038 | 6/1974 | Paull et al. | 423/DIG. 19 X |
| 3,960,910 | 6/1976 | Sudduth et al. | 423/243 X |
| 4,072,740 | 2/1978 | Spevack | 423/563 |
| 4,092,404 | 5/1978 | Hass | 423/539 |
| 4,137,719 | 2/1979 | Rex | 60/641.2 |
| 4,163,044 | 6/1979 | Woertz | 423/234 |
| 4,169,136 | 9/1979 | Hass et al. | 423/539 |
| 4,196,183 | 4/1980 | Li | 423/573 |
| 4,259,300 | 3/1981 | Lieffers | 60/641.2 X |
| 4,311,683 | 1/1982 | Hass et al. | 423/573 G |
| 4,314,983 | 2/1982 | Hass et al. | 423/542 |
| 4,363,215 | 12/1982 | Sharp | 60/641.2 |
| 4,410,432 | 10/1983 | Domahidy | 60/641.2 X |
| 4,444,742 | 4/1984 | Hass et al. | 423/573 G |
| 4,469,668 | 9/1984 | Spevack | 423/573 R |
| 4,576,814 | 3/1986 | Hass et al. | 423/573 G |
| 4,696,680 | 9/1987 | Ghate et al. | 55/73 X |
| 4,737,166 | 4/1988 | Matson et al. | 55/73 X |

OTHER PUBLICATIONS

Abutement of H$_2$S Sulfide Emissions from The Geysers Geothermal Power Plant, Allen et al., 1975; U. N. Symposium.

Primary Examiner—William P. Neuder
Attorney, Agent, or Firm—Walter A. Hackler; Howard R. Lambert

[57] ABSTRACT

Apparatus is provided for treating a flow of hot, pressurized, hydrogen sulfide-containing geothermal steam, particularly a flow of high-energy, surplus steam substantially as produced from the ground. The apparatus comprises a first condenser in which most of the steam in the flow is condensed, and a first separator in which the steam condensate is separated from residual amounts of steam and non-condensable gases (including hydrogen sulfide). An after-cooler is provided for cooling the condensate to a disposal temperature of less than about 200° F. before the condensate is discharged into a disposal well, the disposal temperature being such as to create a vacuum in the disposal well. A second condenser is provided in which is condensed a substantial amount of the steam in the mixture of residual steam and non-condensable gases, the condensate being separated from a mixture of residual steam and non-condensable gases in a second separator. Condensate from the second separator is combined with condensate from the after-cooler and is discharged therewith into the disposal well. The mixture of non-condensable gases and residual amounts of steam is also discharged from the second separator into the disposal well, being drawn thereinto by the vacuum in the well. A corresponding method is provided for treating a flow of geothermal steam so as to control hydrogen sulfide emissions therefrom.

16 Claims, 2 Drawing Sheets

APPARATUS AND METHOD FOR TREATING GEOTHERMAL STEAM WHICH CONTAINS HYDROGEN SULFIDE

BACKGROUND OF THE INVENTION

1. Field of the Invention

This invention relates generally to apparatus and methods for treating fluids which contain hydrogen sulfide and, more particularly, to apparatus and methods for treating geothermal steam which contains significant amounts of hydrogen sulfide prior to disposal of the steam.

2. Background Discussion

Large subterranean reservoirs of naturally occurring steam and/or hot aqueous liquids (geothermal fluids) are found at many locations throughout the world. These geothermal reservoirs are especially prevalent in regions where the earth's near-surface thermal gradient is abnormally high, as evidenced by unusually great volcanic, fumarole, and/or geyser activity. As an example, geothermal fluid reservoirs are fairly common along the rim of the Pacific Ocean, a region long known for its frequent volcanic eruptions.

Collectively, and in some cases individually, such geothermal reservoirs represent a vast, generally self-renewing, reserve of thermal energy which can often compete economically with crude oil when heat is needed or can be used. Consequently, in addition to more traditional therapeutic uses, geothermal fluids, especially geothermal steam and water (brine), have been used as sources of heat for: heating buildings, industrial processes, providing domestic hot water, and other heating purposes. As an example, domestic heating provided by geothermal energy accounts for about thirty percent of the net energy consumed in Iceland.

Although efforts continue to be directed toward expanding the direct use of geothermal fluids for heating purposes, such heating is site-restrictive. Furthermore, factories and other users of geothermal heat cannot always be located near geothermal sources, which are often in remote locations.

Accordingly, greater efforts, particularly in the past several decades, have been directed toward the increased use of geothermal fluids for the production of electric power. Advantages of using geothermal steam in this manner are that electric power has a broader range of uses than heat, and electric power can usually be distributed over wide areas using existing power networks so that its use is not site-restrictive. From about 1940 to about the mid 1970's, worldwide geothermal power generating capacity increased at an average annual rate of about 7 percent. However, since about the mid-1970's, in response to steep increases in the cost of crude oil and in response to crude oil shortages during that period, the annual worldwide growth rate of geothermal electric power generating capacity has been about 19 percent.

As an example of the importance of geothermal energy in this country, geothermal steam-operated power plants at The Geysers in Northern California reportedly produced about 7.4 million megawatts of electric power in 1986, enough to satisfy about 2 percent of the electric power needs of the entire State of California. Significantly, the use of geothermal steam to produce this amount of electric power at The Geysers represents a displacement of about 11.1 million barrels of crude oil valued at about 200 million dollars at 1986 crude oil prices. More generally, in about 1980, the United States Geological Survey estimated that the geothermal resources of this country were equivalent to about $430 \times 10^9$ barrels of oil, not counting the energy which, in the future, may be derived from rock of low porosity and from magma.

Geothermal steam (such as is used at The Geysers) is the easiest, most efficient, and least costly of the aqueous geothermal fluids to use for electric power generation. As an illustration, geothermal steam, at a typical wellhead pressure of between about 140 psig and about 150 psig and at a typical wellhead temperature of between about 320° F. and about 370° F., can be used in the manner of boiler-generated steam in steam-turbine generators. Geothermal water or brine, in contrast, is more difficult to use for power generation, requiring either the converting of some of the geothermal liquid into steam or the use of the geothermal liquid to vaporize a secondary liquid in a closed cycle, binary system. In addition, many serious production and handling problems are caused by the extremely corrosive nature and scale-forming characteristics of most geothermal brines. Although efforts are being made to overcome these problems, the use of geothermal brine for the production of electric power is still usually much more costly than the use of geothermal steam for that purpose.

It might be assumed, because geothermal steam is abundant in some locations and is at a high natural temperature and pressure, that costs associated with the use of geothermal steam for power production are minimal. Such is not the situation, however. Ground leases and/or mineral rights must be procured, and geothermal steam-production wells must then be drilled to steam-producing formations, which, for example, at The Geysers, are typically at depths of about 6,000 feet. The average cost of drilling each such production well is reportedly about 1.32 million dollars. Since, as a rule, about 20,000 pounds/hour of geothermal steam are needed to produce one megawatt/hour of electricity at The Geysers, a typical 110 megawatt power plant in that location requires about 2.2 million pounds of steam per hour to operate at full capacity. About 20 production wells, at a capital expenditure of about 26 million dollars, are usually required to provide this amount of steam on a sustained basis. Substantial additional capital expenditures are required for steam-conducting pipe and associated steam-handling equipment, most of which must be in relatively large sizes in order to conduct the requisite large flow of steam, often over distances as great as a mile, from the production wells to where the electric power is generated.

Other additional costs associated with the use of geothermal steam for electric power generation, as opposed to the use of boiler-generated steam, relate to treatment of the steam for contaminants naturally contained in the steam as it is produced from the ground. In this regard, geothermal steam typically entrains significant amounts of well and formation debris which ordinarily must be separated from the steam before the steam can be used in power-generating turbines. Moreover, geothermal steam normally also contains appreciable amounts of non-condensable gases, such as hydrogen sulfide, ammonia, and carbon dioxide. Of these gases, hydrogen sulfide, which may be present in concentrations as high as about 500 parts per million (ppm) by weight, currently causes significant emission control problems in geothermal steam production and use because emission standards in many localities now strictly regulate the amount of hydrogen sulfide which may be discharged into the atmosphere.

Prior to the recent introduction of strict hydrogen sulfide emission standards, geothermal steam, which is commonly produced and used in relatively remote locations in this country, seldom required treatment for hydrogen sulfide emissions. Now, however, to comply with recent strict emission standards, substantial amounts of hydrogen sulfide generally must be removed before the ultimate disposal of geothermal steam or its condensate. The equipment required for such hydrogen sulfide removal or treatment is expensive to purchase and operate, and these related costs add to the overall cost of producing electric power by the use of geothermal steam.

One hydrogen sulfide emission problem, particularly relevant to the present invention, relates to the disposal of "surplus" geothermal steam which, for the purpose of describing the present invention, is defined as the minimum amount of steam which normally must be produced in order to maintain the production wells in good operating condition and to keep the pipelines hot and ready for immediate steam delivery but which, for various reasons, cannot be used for the generation of electric power. Typically, this minimum production amount of steam is equal to between about 15 percent and about 30 percent of full steam production. Obviously, when (as is usual) surplus steam contains hydrogen sulfide, the abatement of hydrogen sulfide is an important consideration in determining how to dispose of the steam.

Related, at least indirectly, to the hydrogen sulfide abatement problem associated with the disposal of surplus steam is the manner in which geothermal steam power plants are owned and operated. Such power plants are most commonly divided into a steam-producing facility and a power-generating facility, each of which is separately owned and operated. Power-generating facilities are, for example, commonly owned and operated by utility companies whose traditional business has been electric power generation, and steam-generating facilities are commonly owned and operated by oil and gas companies whose traditional business has been the extraction of liquid fuels from the earth. Due to such separate ownership and operation, neither of the two facilities comprising the power plant is directly concerned with problems of the other facility, and even operational problems which affect both facilities cannot always be solved as practically or as efficiently as might be possible if both facilities were commonly owned and operated.

With regard to hydrogen sulfide abatement, the power-generating facility ordinarily has responsibility for controlling hydrogen sulfide emissions from geothermal steam which it accepts and uses. However, whenever the power-generating facility temporarily stops accepting steam from the steam-producing facility because of a power-generation malfunction, the steam-producing facility has the responsibility for meeting hydrogen sulfide emission standards for whatever amount of geothermal steam (that is, surplus steam) it continues to produce while the power-generating facility is "off-line." Although prior to recent impositions of strict hydrogen sulfide emission standards in most localities, the producing facility could usually discharge surplus steam into the atmosphere without treatment, extensive and costly apparatus for removing hydrogen sulfide from the steam are now needed even though the surplus steam may be produced only infrequently, and often for only short intervals of time.

As is more particularly described below, power-generating facilities now generally control hydrogen sulfide emissions by treating the non-condensable gases (including hydrogen sulfide) which are separated from steam condensate after power generation. Such steam condensation and non-condensable gas separation are now typically performed in relatively small-capacity condensers already installed downstream of the steam turbines. Prior to the imposition of strict hydrogen sulfide emission standards, the specific function of these condensers was to increase steam turbine efficiency by condensing the low-energy steam discharged from the turbines, thereby creating a vacuum at the turbine outlets to increase turbine efficiency. The recently added, non-condensable gas treatment equipment may consist of known types of hydrogen sulfide abatement apparatus, more specifically mentioned hereinbelow.

However, hydrogen sulfide abatement systems useful in power-generating facilities for the full-time treatment of low-energy, turbine exhaust steam are generally not economically practical for the treatment of intermittent flows of high-energy, surplus steam in steam-producing facilities. The same is true for other processes, including the chemical treatment of hydrogen sulfide using caustics and hydrogen peroxide. Furthermore, the economics of using such known hydrogen sulfide abatement systems or processes cannot be improved by constructing systems which could be transported from one steam-producing facility to another—even if it were possible to construct such transportable systems—because the power generating problems which result in the production of surplus steam tend to be random in nature, and immediate treatment of surplus steam produced by the steam-producing facilities is necessary to comply with emission standards.

For these and other reasons, geothermal steam-producing facilities presently have an important need for effective, yet economical, apparatus and methods for treating intermittent, high flows of surplus geothermal steam so as to enable disposal of the steam in compliance with existing hydrogen sulfide emission standards. Accordingly, it is a principal objective of the present invention to provide such a hydrogen sulfide treatment apparatus and method.

SUMMARY OF THE INVENTION

The present invention relates to an apparatus and process for treating a flow of hot, pressurized geothermal steam which contains hydrogen sulfide—for example, in a concentration of at least about 10 ppm by weight and usually between about 10 ppm and about 500 ppm by weight. Comprising the apparatus are: (i) means for condensing essentially the entire amount of steam in the flow of the hydrogen sulfide-containing steam into a mixture comprising steam condensate and hydrogen sulfide, (ii) means for separating substantial amounts of the hydrogen sulfide from the mixture comprising condensate and hydrogen sulfide, and (iii) means for cooling the separated condensate to or below a disposal temperature, preferably below about 200° F.

In the preferred embodiment, means are included for disposing of the cooled steam condensate and the separated hydrogen sulfide, and preferably comprise an injection well into which both the condensate and the hydrogen sulfide are discharged. Also, preferably, the disposing means discharge the steam condensate into the injection well in a manner causing a vacuum which draws the hydrogen sulfide into the well. The disposing means may, however, alternatively comprise means for providing the hydrogen sulfide to a hydrogen sulfide abatement system which may be situated in an associated power-generating facility.

According to the preferred embodiment, two stages of steam condensation and condensate-hydrogen sulfide separation are provided to condense the steam and separate hydrogen sulfide therefrom in an efficient manner.

A corresponding method is provided for treating flows of hydrogen sulfide-containing geothermal steam by condensing the steam and then separating the hydrogen sulfide from the condensate for disposal.

BRIEF DESCRIPTION OF THE DRAWINGS

The present invention can be better understood from a consideration of the following detailed description when taken in conjunction with the accompanying drawings, in which.

DESCRIPTION OF THE PREFERRED EMBODIMENT

Figure 1:
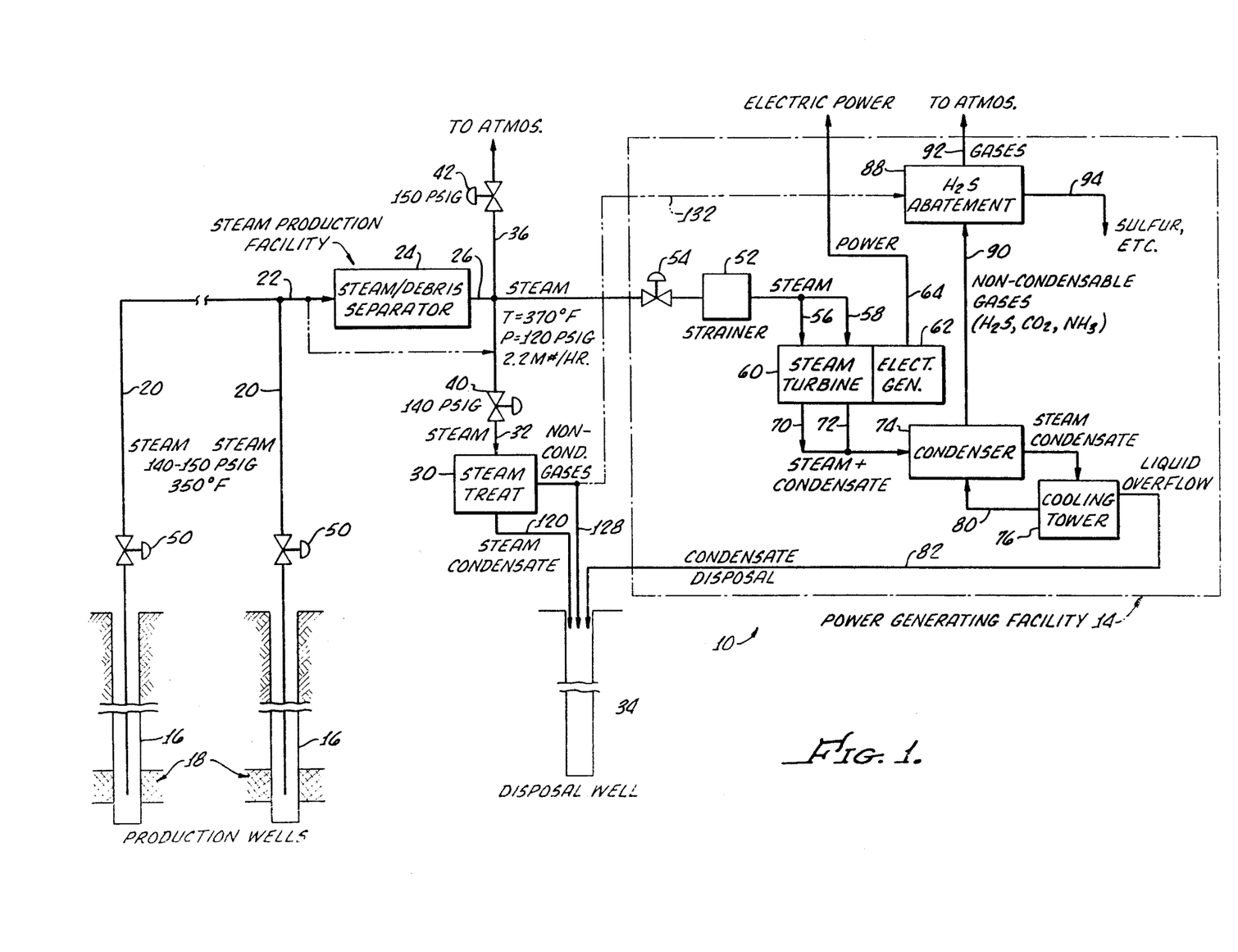
FIG. 1 is a schematic drawing of an exemplary geothermal steam power plant which comprises: (1) a geothermal steam-producing facility with which the steam-treating apparatus and method of the present invention are used, and (2) an associated power-generating facility which uses the produced geothermal steam to generate electric power.

Depicted in schematic form in FIG. 1 is an exemplary geothermal steam power plant 10 in which the present steam-treating apparatus and method may be used to advantage. Generally comprising power plant 10 are a steam-producing facility 12 which incorporates the present invention and an electric power-generating facility 14 which uses the produced steam to generate electric power.

More specifically, and shown greatly simplified in FIG. 1, steam-producing facility 12, with which the present invention is principally concerned, comprises a number of geothermal steam production wells 16. Each such production well 16 is drilled to a geothermal steam producing formation 18 which may be at a depth of several thousand feet; for example, about 6,000 feet at The Geysers. In an exemplary case used for describing the present invention, the geothermal steam produced from wells 16 has a wellhead pressure of between about 140 psig and about 150 psig and a wellhead temperature of about 370° F. In most localities, the produced geothermal steam will have a hydrogen sulfide concentration in excess of about 10 ppm by weight and in the present example is considered to have a hydrogen sulfide concentration of between about 200 ppm by weight and about 500 ppm by weight.

Although well production rates may vary substantially, even in the same locality, a typical geothermal steam well is usually capable of producing at least about 100,000 pounds of geothermal steam per hour on a sustained basis, for example, for a power plant design life of about thirty years. Assuming, therefore, that power production facility 14 has a power-generating capacity of about 110 megawatts, thereby requiring a sustained steam flow of about 2.2 million pounds per hour, about 20 production wells 16 would be provided.

Hot, pressurized, geothermal steam from each production well 16 flows through a feeder conduit 20 to a central collection conduit or manifold 22. The collected steam flows through conduit 22 to a separator 24 in which well debris, such as sand and silt, is separated from the steam. From separator 24, the cleaned steam flows through a conduit 26 to power-generating facility 14. To illustrate typical equipment sizes, the above-mentioned steam supply rate of about 2.2 million pounds per hour requires conduit 26 to be constructed of about 42-inch pipe. Debris is periodically removed from separator 24 by any convenient means, not shown.

As more particularly discussed hereinafter, further comprising steam-producing facility 12 are steam-treating means 30, to which surplus steam from conduit 26 is diverted through a conduit 32; a condensate and non-condensable gas disposal well 34; a steam vent conduit 36; pressure-controlled, flow-regulating valves 40 and 42 in respective conduits 32 and 36; and flow-throttling valves 50 in feed conduits 20 from production wells 16.

After being received through conduit 26 into power-generating facility 14, the cleaned geothermal steam is flowed through a strainer 52 to assure that all the well debris has been adequately removed from the steam (by separator 24) before the steam is used to generate power. A normally-open, shut-off valve 54 in conduit 26 enables power-producing facility 14 to reject (that is, to stop receiving) steam from producing facility 12 in the event of a power plant malfunction or shutdown, as discussed below.

From strainer 52, steam is fed through conduits 56 and 58 into a steam turbine 60 having (as shown) two, in-series, steam inputs. Connected, in driven relationship, to steam turbine 60 is an electric-power generator 62 which provides generated electric power on an output line 64, for example, to an existing power distribution grid, not shown.

"Used" steam with a much lowered-energy content, and possibly with some condensate, is discharged from steam turbine 60 through conduits 70 and 72 to a condenser 74 which is preferably configured for providing a vacuum of about 4 inches of mercury, to the steam outlet side of turbine 60. The efficiency of turbine 60 is substantially increased by the use of condenser 74, typically by a factor of about two over the efficiency of the turbine if the steam were to be discharged at atmospheric pressure.

Operatively associated with condenser 74 is a conventional cooling tower 76 to which steam condensate from the condenser is flowed through a conduit 78. From cooling tower 76, the steam condensate is recirculated through a conduit 80 back into condenser 74 for use in the steam-condensation process. As shown in FIG. 1, a condensate overflow conduit 82 is connected to cooling tower 76 for flowing any excess steam condensate from the cooling tower to disposal well 34 (associated with steam-producing facility 12).

In condenser 74, non-condensable gases, including hydrogen sulfide and such other gases as ammonia and carbon dioxide, present in the steam are separated from the steam. Prior to the recent imposition of strict hydrogen sulfide emission standards, the separated, non-condensable gases were usually discharged from condenser 74 into the atmosphere without hydrogen sulfide abatement. However, where strict hydrogen sulfide emission standards have been imposed, a hydrogen sulfide abatement system 88, which receives the flow of non-condensable gases from condenser 74 through conduit 90, is now provided for removing hydrogen sulfide from the gases before the gases are vented through a conduit 92 to the atmosphere. Separated products are removed from hydrogen sulfide abatement system 88 through a conduit 94.

Hydrogen sulfide abatement system 88 may comprise a generally conventional Stretford unit, as is known in the oil and gas industry, or may comprise other apparatus effective for removing hydrogen sulfide from a flow of gases. For example, U.S. Pat. Nos. 4,169,136; 4,311,683; 4,314,983; and 4,444,742 relate to converting hydrogen sulfide to sulfur or sulfur dioxide and are incorporated hereinto in their entirety.

As above-mentioned, steam condensers corresponding to condenser 74, used in at least those power-generating facilities constructed prior to the institution of strict hydrogen sulfide emission standards, are typically built for the specific purpose of condensing the flow of reduced-energy steam ("used" steam) from the steam turbines so as to create a vacuum on the turbine discharge side and increase turbine efficiency. As a result, such condensers are usually inadequate for condensing high-energy, surplus steam, even if turbine-bypassing provisions were provided for routing the surplus steam to the condensers (instead of requiring disposal of surplus steam by the associated steam-producing facility 12).

So far as is known, some new power-generating facilities (corresponding to facility 14) have been designed to use special, high-capacity steam condensers suitable both for condensing the used steam from the steam turbines and for the hydrogen sulfide treatment of a flow of high energy, surplus geothermal steam, thereby enabling power-generating facility 14 itself to dispose of surplus steam in the event of a shutdown. In such new power-generating facilities, turbine bypasses are necessarily included to enable steam from the steam-producing facility (corresponding to facility 12) to be flowed directly into the condenser. Although such provisions are designed to enable the new power-generating facilities to accept and process surplus geothermal steam in event of a turbine or generator malfunction, it may still be necessary for steam-producing facilities to have their own hydrogen sulfide abatement equipment to cover power-generating facility malfunction situations in which the producing facilities must dispose of the surplus steam. In any event, the extensive retrofitting of existing power-generating facilities with increased capacity condensers and turbine-bypassing equipment to enable these facilities to treat surplus steam is generally economically impractical due, at least in part, to lost power revenue during shutdown for the retrofitting.

Presently, at least in most existing power-generating facilities 14, a shutdown condition results in the immediate closing of steam shut-off valve 54 in conduit 26, thereby relegating the problem of disposing of the surplus steam to steam-producing facility 12. For an assumed total steam production rate of about 2.2 million pounds per hour (required by power-producing facility 14 to generate 110 megawatts of power), the amount of surplus steam to be treated and disposed in steam-producing facility 12 may be as great as about 600,000 pounds per hour.

Figure 2:
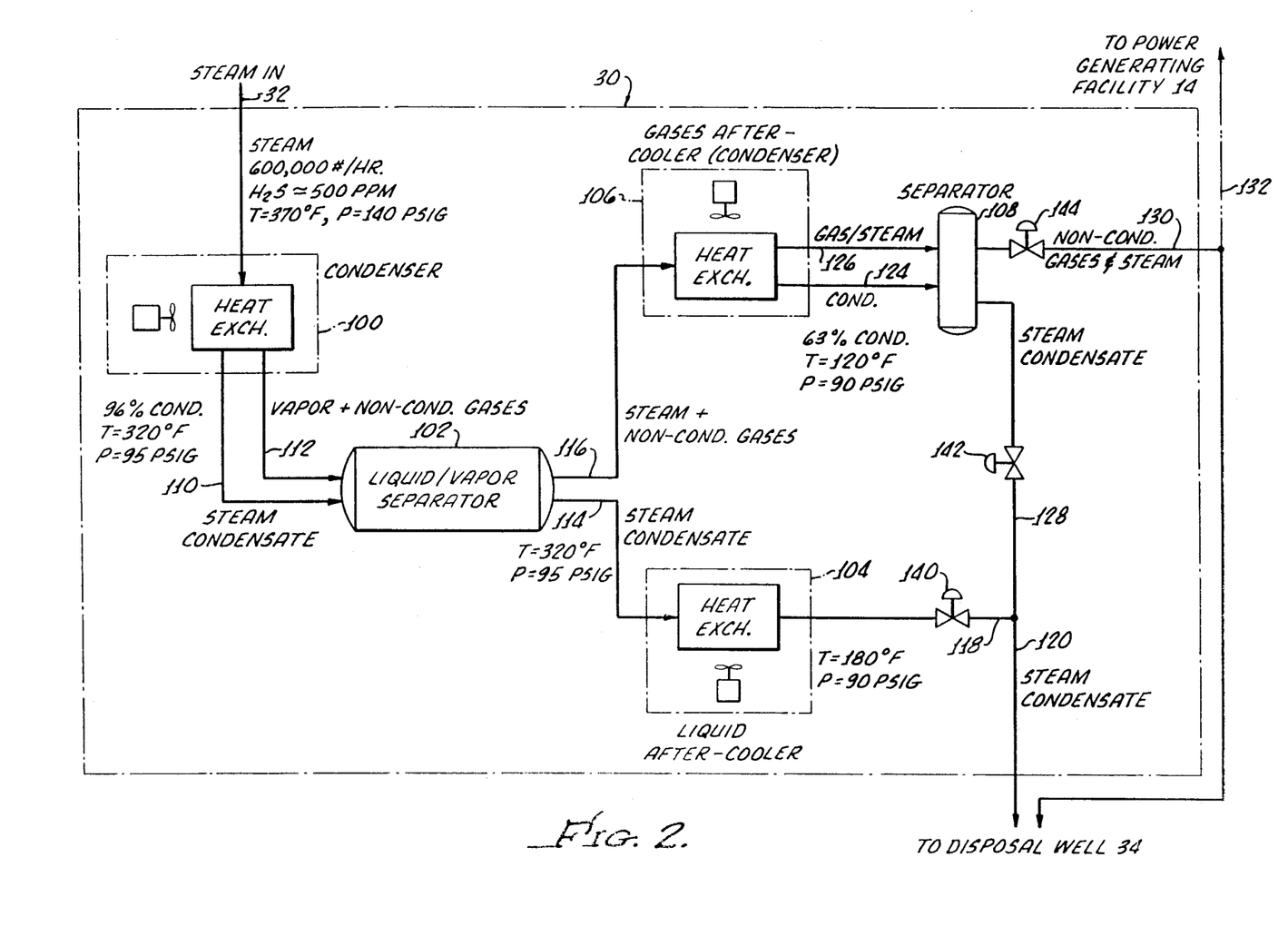
FIG. 2 is a schematic drawing of a surplus geothermal steam-treating portion of the steam-producing facility of FIG. 1, the steam-treating portion being used to control hydrogen sulfide emissions.

More specifically, as shown in FIG. 2, steam-treating means 30 preferably incorporates two stages of steam condensation and condensate-gas separation. As such, steam-treating means 30 comprise a first steam condenser 100, a first condensate-vapor and gas separator 102, a condensate after-cooler 104, a second steam condenser 106 (which may also be referred to as a gas aftercooler), and a second condensate-vapor and gas separator 108. The present inventors have determined that the use of two condensers 100 and 106 and two separators 102 and 108 is more economical for the treatment of surplus steam than the use of only a single, larger condenser and a single, larger separator.

Steam-treating means 30 can best be described by considering an illustrative example in which full steam production is assumed to be at a rate of about 2.2 million pounds per hour and the corresponding surplus steam production rate is assumed to be about 600,000 pounds per hour. Further assumed, by way of example, are a steam temperature of about 370° F., a steam pressure of about 140 psig, and a maximum hydrogen sulfide concentration in the steam of about 500 ppm by weight. It is, however, to be understood that the present invention is not limited to such assumed conditions.

When a production-related malfunction occurs in power-generating facility 14, shut-off valve 54 in conduit 26 is closed, thereby immediately stopping the full, 2.2 million pounds per hour flow of steam into the power-generating facility and causing the pressure in conduit 26 to increase rapidly. When the pressure in conduit 26 reaches a predetermined level, for example, about 150 psig, both valve 42 (in steam vent conduit 36) and valve 40 (in steam-treating conduit 32) open simultaneously, thereby venting some of the large flow of steam into the atmosphere without treatment and flowing some of the steam into steam-treating means 30 for hydrogen sulfide abatement. In this regard, present emission regulations ordinarily permit ten minutes for hydrogen sulfide emissions to be brought under control. During this ten-minute "grace" period, throttling valves 50 in production well conduits 20 are operated to rapidly decrease the production from the full (2.2 million pounds per hour) rate to the surplus steam rate, which, as above-assumed is a maximum of about 600,000 (or more) pounds per hour. As steam production is throttled back, steam pressure in conduit 26 starts dropping due to steam being vented through valve 42. When the pressure in conduit 26 drops to a predetermined level, for example, about 140 psig, valve 42 in vent conduit 36 automatically closes so that all the surplus steam is caused to flow through conduit 32 and valve 40 into steam-treating means 30.

Further in regard to steam-treating means 30, first condenser 100 is preferably configured to condense at least about 90 percent, and more preferably at least about 96 percent, of the geothermal steam provided to it through conduit 32. First condenser 100 is also preferably configured to provide steam condensate, residual amounts of steam, and non-condensable gases (including hydrogen sulfide) at an output temperature of about 320° F. and an output pressure of about 95 psig. These exemplary (or any other specified) temperature and pressure, input-output characteristics of first condenser 100, for a particular flow rate of geothermal steam having particular characteristics, completely define the condenser and are all that vendors of such equipment require to enable construction of the condenser. First condenser may, however, for the example considered herein, comprise a plurality of air-cooled, finned-tube heat exchangers, each of which may be about 13 feet wide and about 45 feet long.

The steam condensate from condenser 100 is flowed to first separator 102 through a conduit 110. Advantageously, an output flow comprising steam and non-condensable gases is provided by first condenser 100 to first separator 102 through a separate conduit 112. Alternatively, a mixture comprising steam condensate, residual amounts of steam, and non-condensable gases may be flowed from first condenser 100 to first separator 102 through a common conduit (for example, conduit 110). It is to be appreciated, however, that complete separation of the condensate from residual steam and non-condensable gases is usually not accomplished in first condenser 100, so that even when separate output flows of condensate and of non-condensable gases and residual steam are provided from the first condenser, both flows normally contain some of all three components.

First separator 102 may be of a conventional type and, in accordance with the example set forth herein, may be about 30 feet long and about 6 to 7 feet in diameter. Within first separator 102, the non-condensable gases and the residual amount of steam are separated from the steam condensate, the input and output conditions of first separator being about the same. The steam condensate from first separator 102 flows to liquid after-cooler 104 through a conduit 114. The output flow comprising a mixture of non-condensable gases (including, as before-mentioned, hydrogen sulfide) and the residual amount of non-condensed steam flows from first separator 102 through a conduit 116 to second condenser 106.

Within condensate after-cooler 104, the steam condensate received from first separator 102 through conduit 114 is cooled (and the pressure is accordingly somewhat reduced) so that the vapor pressure of the condensate discharged therefrom is preferably less than the vapor pressure in disposal well 34 (FIG. 1). For example, the condensate may be cooled in after-cooler 104 from an inlet temperature of about 320° F. to an outlet temperature of less than about 200° F. and more preferably to a temperature of less than about 180° F. The condensate outlet pressure from after-cooler 104 is preferably about 90 psig, as compared to the condensate inlet pressure of about 95 psig. The input and output temperatures and pressures of the steam condensate and the condensate mass flow rate completely define after-cooler 104 for procurement purposes. However, in order to minimize equipment costs, after-cooler 104 is preferably an air-cooled, finned-tube heat exchanger of the type used in first condenser 100.

The advantage of cooling the steam condensate in after-cooler 104 so that the condensate vapor pressure is less than the vapor pressure in disposal well 34 is that the discharge of condensate through conduits 118 and 120 into the well then creates a vacuum in the well which draws the separated non-condensable gases into the well, as further discussed below, thereby facilitating disposal of the hydrogen sulfide. A pump (not shown) may, if needed, be installed in conduit 118 to pump condensate from after-cooler 104 to disposal well 34.

Within second condenser 106, there is condensed a substantial amount of the steam in the mixed flow of residual steam and non-condensable gases received through conduit 116 from first separator 102. Second condenser 106 is preferably constructed to condense at least about 50 percent of the residual steam, and is more preferably constructed to condense about 63 percent of the residual steam.

The output of condensate is flowed from second condenser 106 to second separator 108 through a conduit 124 and an output, mixed flow comprising residual steam and noncondensable gases is provided to the second separator though a conduit 126. However, complete separation of the condensate from the residual steam and non-condensable gases is ordinarily not provided by second condenser 106 and both output flows typically contain some of all three components (that is, condensate, steam, and non-condensable gases). As an alternative to providing two separate output flows of condensate and of residual steam and non-condensable gases from second condenser 106, a single, mixed flow may be provided to second separator 108 through a single conduit—for example, conduit 124.

The output flows (or flow) from second condenser 106 are preferably at a temperature of about 120° F. and a pressure of about 90 psig. The inlet and outlet temperatures and pressures of second condenser 106, along with the mass flow rate through the condenser, completely define the second condenser for procurement purposes. It is, however, preferred, for reasons of economy, that second condenser 106 comprise an air-cooled, finned-tube heat exchanger of the type used in first condenser 100.

Second separator 108, which may be about 6 feet high and about 2–3 feet in diameter, separates the steam condensate from the condensate, residual steam, and non-condensable gases flowed into the separator. From second separator 108 steam condensate flows through a conduit 128 into conduit 120 through which condensate is discharged from after-cooler 104. Non-condensable gases (including hydrogen sulfide) mixed with residual amounts of steam are discharged from second separator 108 through a conduit 130. Generally, the mixed flow comprising non-condensable gases and residual amounts of steam are flowed through conduit 130 into disposal well 34 (FIGS. 1 and 2), the steam and gases (including hydrogen sulfide) being drawn down into the well by the vacuum caused by discharge of condensate thereinto through conduit 120. In some instances, however, it may alternatively be possible and/or advantageous to flow the mixture of non-condensable gases and residual steam from second separator 108 through a conduit 132 (shown in FIGS. 1 and 2 in phantom lines) to hydrogen sulfide abatement system 88 in associated power-generating facility 14.

Valves 140, 142, and 144 in respective conduits 118, 128, and 130 are provided for controlling the flows of condensate and non-condensable gases/residual steam into disposal well 34 and the operation of steam-treating means 30. Valve 140 in condensate conduit 118 may advantageously be controlled by the liquid level in first separator 102; valve 142 in condensate conduit 128 may advantageously be controlled by the liquid level in second separator 108; and valve 144 in gas conduit 130 may advantageously be controlled by the pressure in first separator 102.

A corresponding method is provided for treating a flow of hot, pressurized, geothermal steam which contains significant amount of hydrogen sulfide along with other non-condensable gases. As is evident from the above-description, the process generally comprises condensing substantial amounts of the steam in the flow of hydrogen sulfide-containing steam; separating the steam condensate from a mixture which comprises condensate, hydrogen sulfide (that is, non-condensable gases) and residual steam; and disposing of the condensate, hydrogen sulfide and residual steam, preferably into a disposal well.

Although there has been described above an apparatus and a corresponding method for treating a flow of hot, pressurized, hydrogen sulfide-containing, geothermal steam for the purpose of illustrating the manner in which the present invention may be used to advantage, it is to be appreciated that the invention is not limited thereto. Accordingly, any and all modifications or variations which may occur to those skilled in the art are to be considered to be within the scope and spirit of the invention as defined in the appended claims.

What is claimed is:

1. Apparatus for treating and disposing of a flow of hot, pressurized, geothermal steam containing hydrogen sulfide, the apparatus comprising:
    (a) condensing means for condensing substantially sulfide-containing geothermal steam into a mixture comprising steam condensate and hydrogen sulfide;
    (b) separating means for separating said mixture comprising steam condensate and hydrogen sulfide into a flow comprising steam condensate and a flow comprising hydrogen sulfide; and
    (c) means for causing a vacuum in an injection well in order to draw the flow comprising hydrogen sulfide thereinto.

2. The geothermal steam-treating and disposing apparatus as claimed in claim 1 wherein said means for causing a vacuum comprises means for lowering the vapor pressure of the steam condensate to a level below the vapor pressure in the injection well and means for disposing of said flow comprising steam condensate and the flow comprising hydrogen sulfide into said injection well.

3. The geothermal steam-treating and disposing apparatus as claimed in claim 2 wherein the means for lowering the steam condensate vapor pressure includes cooling means for cooling the steam condensate at least about 100° F. before disposing of the cooled steam condensate into said injection well in order to draw the flow comprising hydrogen sulfide into said injection well.

4. Apparatus for treating and disposing of a flow of hot, pressurized, geothermal steam containing at least about 10 ppm by weight of hydrogen sulfide; the apparatus comprising:
    (a) condensing means for condensing substantially all of the steam in the flow of hydrogen sulfide-containing geothermal steam into a mixture comprising steam condensate and hydrogen sulfide;
    (b) separating means for separating a substantial amount of the hydrogen sulfide from said mixture comprising steam condensate and hydrogen sulfide, and for providing a flow comprising steam condensate and another flow comprising hydrogen sulfide;
    (c) means for causing a vacuum in an injection well in order to draw the flow comprising hydrogen sulfide thereinto; and
    (d) disposing means for disposing of said flow comprising steam condensate and said flow comprising hydrogen sulfide.

5. The geothermal steam-treating apparatus as claimed in claim 4 wherein the disposing means comprises means for discharging the cooled steam condensate and the flow comprising hydrogen sulfide into said injection well.

6. The geothermal steam-treating apparatus as claimed in claim 5 wherein said means for causing a vacuum in the injection well comprises cooling means for cooling the flow comprising steam condensate to a temperature of less than about 200° F. so that the cooled steam condensate causes a vacuum in said injection well when injected thereinto which draws the flow comprising hydrogen sulfide into the injection well.

7. Apparatus for treating a flow of hot, pressurized, geothermal steam containing at least about 10 ppm by weight of hydrogen sulfide, the apparatus comprising:
    (a) first condensing means for condensing a substantial amount of the steam in the flow of hydrogen sulfide-containing geothermal steam, and for providing an output comprising steam condensate, residual amounts of geothermal steam and hydrogen sulfide;
    (b) first separating means connected for receiving said output from the first condensing means and for providing separate output flows, one of said output flows consisting essentially of steam condensate and another of said output flows comprising hydrogen sulfide and said residual amounts of geothermal steam;
    (c) second condensing means, connected for receiving the flow comprising hydrogen sulfide and the residual amounts of geothermal steam from the first separating means, for condensing the residual amounts of geothermal steam and for providing an output comprising steam condensate, steam and hydrogen sulfide;
    (d) second separating means, connected for receiving the output from the second condensing means, for providing separate output flows, one of said output flows consisting essentially of steam condensate and another of said output flows comprising hydrogen sulfide and residual amounts of steam;
    (e) means for causing a vacuum in an injection well in order to draw the output flow comprising hydrogen sulfide and residual amounts of steam into the injection well, said means comprising cooling means, connected for receiving the flow consisting essentially of steam condensate from the first separating means, for providing an output flow consisting essentially of steam condensate cooled to or below a disposal temperature and
    (f) disposing means for disposing of the output flows consisting essentially of steam condensate from the cooling means and the second separating means and the output flow comprising hydrogen sulfide and residual amounts of steam from the second separating means into said injection well.

8. The geothermal steam-treating apparatus as claimed in claim 7 wherein the first condensing means are configured for condensing at least about 90 percent of the steam in the flow of hydrogen sulfide-containing geothermal steam into steam condensate.

9. The geothermal steam-treating apparatus as claimed in claim 7 wherein the second condensing means are configured for condensing at least about 50 percent of the residual amount of geothermal steam in the flow of hydrogen sulfide and residual amounts of steam from the first separating means.

10. Apparatus for treating and disposing of a flow of hot, pressurized, geothermal steam having a temperature of at least about 320° F. and a pressure of at least about 140 psig and which contains at least about 10 ppm by weight of hydrogen sulfide; the apparatus comprising:
- (a) first condensing means for condensing at least about 90 percent of the steam in the flow of hydrogen sulfide-containing geothermal steam, and for providing an output comprising steam condensate, residual amounts of steam, and hydrogen sulfide;
- (b) first separating means, connected in order to receive said output from the first condensing means, for providing separate output flows, one of said output flows consisting essentially of steam condensate and another of said output flows comprising hydrogen sulfide and residual amounts of steam;
- (c) second condensing means, connected in order to receive the flow comprising hydrogen sulfide and residual amounts of steam from the first separating means, for condensing at least about 50 percent of the residual amounts of steam, and for providing an output comprising steam condensate, steam and hydrogen sulfide;
- (d) second separating means, connected in order to receive the output from the second condensing means, for providing separate output flows, one of said output flows consisting essentially of steam condensate and another of said output flows comprising hydrogen sulfide and residual amounts of steam;
- (e) means for causing a vacuum in an injection well in order to draw the output flow comprising hydrogen sulfide and residual amounts of steam into the injection well, said means comprising cooling means, connected in order to receive the flow consisting essentially of steam condensate from the first separating means, for providing an output flow consisting essentially of steam condensate cooled to or below a disposal temperature; and
- (f) disposing means for disposing of the flows consisting essentially of steam condensate from the cooling means and the second separating means and the flow comprising steam and hydrogen sulfide from the second separating means into said injection well.

11. A method for treating and disposing of a flow of hot, pressurized, geothermal steam which contains significant amounts of hydrogen sulfide, the method comprising the steps of:
- (a) condensing substantially all the steam in the flow of hydrogen sulfide-containing geothermal steam into a mixture comprising steam condensate, and hydrogen sulfide;
- (b) separating hydrogen sulfide from said mixture comprising steam condensate and hydrogen sulfide;
- (c) cooling the resulting separated steam condensate to or below a disposal temperature; and
- (d) injecting the cooled concentrate into an injection well for disposal thereof and in order to cause a vacuum therein for drawing the separated hydrogen sulfide thereinto.

12. A method for treating and disposing of a flow of hot, pressurized, geothermal steam containing at least about 10 ppm by weight of hydrogen sulfide, the method comprising the steps of:
- (a) condensing substantially all the steam in the flow of hydrogen sulfide-containing geothermal steam into a mixture comprising steam condensate and hydrogen sulfide;
- (b) separating substantial amounts of the hydrogen sulfide from said mixture comprising steam condensate and hydrogen sulfide, and providing a flow comprising steam condensate and a separate flow comprising hydrogen sulfide;
- (c) cooling said flow comprising steam condensate to or below about 200° F.; and
- (d) disposing of said cooled steam condensate by injection into an injection well, said injection of cooled steam condensate causing a vacuum in the injection well for drawing said flow comprising hydrogen sulfide thereinto.

13. A method for treating and disposing of a flow of hot, pressurized, geothermal steam comprising at least about 10 ppm by weight of hydrogen sulfide, the method comprising the steps of:
- (a) condensing, in a first condensing step, a substantial amount of the steam in the flow of hydrogen sulfide-containing geothermal steam, and providing an output comprising steam condensate, residual amounts of geothermal steam, and hydrogen sulfide;
- (b) separating, in a first separating step, the output from the first condensing step, and providing an output flow consisting essentially of steam condensate and another output flow comprising hydrogen sulfide and said residual amounts of geothermal steam;
- (c) cooling the output flow consisting essentially of steam condensate from the first separating step, and providing an output flow consisting essentially of steam condensate cooled to or below about 200° F.;
- (d) condensing, in a second condensing step, a substantial amount of said residual geothermal steam in the flow comprising hydrogen sulfide and residual amount of geothermal steam from the first separating step, and providing an output comprising steam condensate, steam, and hydrogen sulfide;
- (e) separating, in a second separating step, the output from the second condensing step, and providing an output flow consisting essentially of steam condensate and another output flow comprising hydrogen sulfide and residual amounts of steam; and
- (f) disposing of the output flows consisting essentially of steam condensate from the cooling step and the second separating step by injection into an injection well, said injection of cooled steam condensate causing a vacuum in the injection well for drawing the output flow comprising hydrogen sulfide and residual amounts of steam from the second separating step into the injection well.

14. The geothermal steam-treating method as claimed in claim 13 wherein the first condensing step condenses at least about 90 percent of the steam in the flow of hydrogen sulfide-containing geothermal steam into steam condensate.

15. The geothermal steam-treating method as claimed in claim 13 wherein the second condensing step condenses at least about 50 percent of the residual amount of geothermal steam in the flow comprising hydrogen sulfide and residual amounts of steam from the first separating step.

16. A method for treating a flow of hot, pressurized, geothermal steam having a temperature of at least about 320° F. and a pressure of at least about 140 psig and containing at least about 10 ppm by weight of hydrogen sulfide, the method comprising the steps of:

(a) condensing, in a first condensing step, at least about 90 percent of the steam in the flow of hydrogen sulfide-containing geothermal steam, and providing an output comprising steam condensate, residual amounts of steam, and hydrogen sulfide;
(b) separating, in a first separating step, the output from the first condensing step, and providing an output flow consisting essentially of steam condensate and another output flow comprising hydrogen sulfide and residual amounts of steam;
(c) cooling the flow consisting essentially of steam condensate from the first separating step, and providing an output flow consisting essentially of steam condensate cooled to or below about 200° F.;
(d) condensing, in a second condensing step, at least about 50 percent of the residual amounts of steam from the flow comprising hydrogen sulfide and residual amounts of steam from the first separating step, and providing an output comprising steam condensate, steam, and hydrogen sulfide;
(e) separating, in a second separating step, the output from the second condensing step, and providing an output flow consisting essentially of steam condensate and another output flow comprising hydrogen sulfide and residual amounts of steam; and
(f) disposing of the flows consisting essentially of steam condensate and the flow comprising steam and hydrogen sulfide, said disposing step including discharging into an injection well the output flows consisting essentially of steam condensate from the cooling step and the second separating step and said flow comprising hydrogen sulfide and residual amounts of steam from the second separating step, the discharging of the flows of steam condensate into the injection well causing a vacuum in the well which draws the flow comprising hydrogen sulfide and residual amounts of steam thereinto.

* * * * *

UNITED STATES PATENT AND TRADEMARK OFFICE
CERTIFICATE OF CORRECTION

PATENT NO. : 4,844,162

DATED : July 4, 1989

INVENTOR(S) : Brian W. Maassen and Richard G. Campbell

It is certified that error appears in the above-identified patent and that said Letters Patent is hereby corrected as shown below:

Column 11, line 18, before "sulfide-containing" insert --all the steam in the flow of hydrogen--.

Column 14, line 14, change "comprising" to --containing--.

Signed and Sealed this

Twenty-eighth Day of August, 1990

Attest:

HARRY F. MANBECK, JR.

Attesting Officer

Commissioner of Patents and Trademarks